(12) United States Patent
Lim et al.

(10) Patent No.: US 10,114,279 B2
(45) Date of Patent: Oct. 30, 2018

(54) VEHICLE HEADLAMP FOR PROJECTING DRIVING INFORMATION

(71) Applicant: HYUNDAI MOTOR COMPANY, Seoul (KR)

(72) Inventors: Jung Wook Lim, Seoul (KR); Jik Soo Shin, Incheon (KR); Keon Soon Jin, Ulsan (KR); Ki Hong Lee, Seoul (KR); Byoung Suk Ahn, Gwacheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/370,727

(22) Filed: Dec. 6, 2016

(65) Prior Publication Data

US 2018/0095355 A1    Apr. 5, 2018

(30) Foreign Application Priority Data

Sep. 30, 2016   (KR) .......................... 10-2016-0126082

(51) Int. Cl.
  *G03B 21/14*   (2006.01)
  *G03B 21/28*   (2006.01)
  (Continued)

(52) U.S. Cl.
  CPC .............. *G03B 21/28* (2013.01); *B60Q 1/04* (2013.01); *F21S 41/285* (2018.01); *F21S 41/30* (2018.01);
  (Continued)

(58) Field of Classification Search
  CPC ......... B60Q 1/04; B60Q 2400/50; F21S 8/10; F21S 48/125; F21S 48/1388;
  (Continued)

(56) References Cited

U.S. PATENT DOCUMENTS

2013/0021812 A1\*  1/2013  Schug ................... F21S 41/143
                                                362/487
2013/0058114 A1\*  3/2013  Reiners ................ F21S 48/1136
                                                362/510

(Continued)

FOREIGN PATENT DOCUMENTS

JP        2013-522853 A      6/2013
JP        2016-088395 A      5/2016
           (Continued)

*Primary Examiner* — Sultan Chowdhury
*Assistant Examiner* — Magda Cruz
(74) *Attorney, Agent, or Firm* — McDonnell Boehnen Hulbert & Berghoff LLP

(57) ABSTRACT

A vehicle headlamp device is disclosed that is capable of projecting driving information onto the road using a high beam and of improving visibility of an image containing the driving information projected onto the road. Specifically, as the result of adjusting the color of the image suitable for the driving information projected onto the road, the driver is capable of more easily perceiving the driving information due to the image having a specific color corresponding to the driving information. In addition, as the result of correcting an anamorphically-enlarged image using an anamorphic lens, the image containing the driving information is projected onto the road more clearly.

12 Claims, 3 Drawing Sheets

(51) Int. Cl.
*B60Q 1/04* (2006.01)
*F21S 41/30* (2018.01)
*F21S 41/675* (2018.01)
*F21S 41/20* (2018.01)
*G02B 5/20* (2006.01)
*G02B 13/08* (2006.01)
*G02B 13/16* (2006.01)
*G02B 26/08* (2006.01)
*G02B 27/00* (2006.01)
*G03B 29/00* (2006.01)

(52) U.S. Cl.
CPC ............ *F21S 41/675* (2018.01); *G02B 5/201* (2013.01); *G02B 13/08* (2013.01); *G02B 13/16* (2013.01); *G02B 26/0833* (2013.01); *G02B 27/0025* (2013.01); *G03B 29/00* (2013.01)

(58) Field of Classification Search
CPC .... F21S 48/1757; F21S 48/1225; F21S 48/13; G03B 21/14; G03B 29/00; G03B 21/28; G02B 5/201; G02B 13/16; G02B 26/0833
See application file for complete search history.

(56) References Cited

U.S. PATENT DOCUMENTS

| | | | |
|---|---|---|---|
| 2015/0085514 A1* | 3/2015 | Yagi .................... | F21S 48/1317 362/538 |
| 2015/0092435 A1* | 4/2015 | Yamamura ........... | B60Q 1/0005 362/512 |
| 2017/0074478 A1* | 3/2017 | Yang .................... | F21S 48/1145 |

FOREIGN PATENT DOCUMENTS

| | | |
|---|---|---|
| JP | 2016-162682 A | 9/2016 |
| KR | 10-20090096994 A | 9/2009 |
| KR | 10-2012-0054159 A | 5/2012 |
| KR | 10-20140080051 A | 6/2014 |
| WO | WO2013-104075 A1 | 7/2013 |

* cited by examiner

VEHICLE HEADLAMP FOR PROJECTING DRIVING INFORMATION

CROSS-REFERENCE TO RELATED APPLICATION

This application claims the benefit of and priority to Korean Patent Application No. 10-2016-0126082, filed on Sep. 30, 2016, in the Korean Intellectual Property Office, the disclosure of which is incorporated herein by reference.

BACKGROUND

1. Technical Field

The present invention relates to a vehicle headlamp, and more particularly to a vehicle headlamp vehicle capable of projecting information onto the road using a high beam.

2. Description of the Related Art

Generally, a vehicle is equipped with a headlamp that provides a clear field of vision to a driver of the vehicle in a driving direction in darkened conditions (e.g night, inclement weather, etc.) while informing other drivers or pedestrians of the presence of the vehicle. A headlamp, also called a headlight, emits light to illuminate the road ahead of the vehicle.

Recently, vehicles have been equipped with an adaptive headlamp system, which is adapted to adjust the horizontal and vertical angles of the headlamp in accordance with a vehicle driving state, such as the steering angle or vehicle velocity, while traveling at a medium to high rate of speed. Further, the headlamp system projects an image containing driving information onto the road while the vehicle is traveling at a low speed, which can improve driving safety.

However, the distance that a light beam from the headlamp travels when the vehicle travels at a medium or high rate of speed is different from that when the vehicle travels at a low rate of speed, while the color of the light beam remains the same regardless of the vehicle speed, which leads to deterioration of visibility of an image containing driving information projected onto the road while the vehicle is traveling at a low rate of speed.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE DISCLOSURE

The present disclosure addresses the above problems by providing a vehicle headlamp device capable of projecting driving information onto the road using a high beam and of improving the visibility of the image containing the driving information projected onto the road.

In accordance with an example embodiment of the present disclosure, the above and other objects are accomplished by a vehicle headlamp device comprising: a light source; a reflection unit that reflects light emitted from the light source and has a plurality of light reflection sections for changing a path of the light; a primary optical system that receives light reflected by the reflection unit along a first path and emits the reflected light as a high beam; and an auxiliary optical system having a plurality of color patterns for changing a color of the light incident thereto that receives light reflected by the reflection unit along a second path different from the first path and projects the light onto a road.

In an example embodiment, the reflection unit may be embodied as a digital micro-mirror device ("DMD"), comprising a plurality of micro mirrors that can be switched on or off in response to a driving signal so as to be changed the angle of the mirrors, thereby changing the path of the light incident thereto.

The reflection unit may be divided into a primary section for reflecting light from the light source toward the primary optical system and a secondary section for reflecting the light from the light source toward the auxiliary optical system.

The reflection unit secondary section may be divided into a plurality of sub-sections corresponding to the color patterns of the auxiliary optical system.

The primary optical system may include a plurality of lenses, and the auxiliary optical system may be mounted to one of the plurality of lenses of the primary optical system. The lens to which the auxiliary optical system is mounted is a lens to which the light reflected by the reflection unit is first incident.

The primary optical system may include a dual lens, a first lens, a second lens, and an aspherical lens.

The auxiliary optical system may include a multi-colored lens unit having a plurality of color patterns, to which the light reflected by the reflection unit is incident, and a light collection unit disposed adjacent to the multi-colored lens unit and configured to collect the light, a color of which has been changed by the multi-colored lens unit, and to emit the light.

The multi-colored lens unit may be divided into a green-colored section, a red-colored section and a blue-colored section, and each of the colored sections may be mounted to the primary optical system using a bracket.

The light emitted from the light source may be reflected by the reflection unit and may be converted into an anamorphically-enlarged image. The auxiliary optical system may further include an anamorphic lens, and when the light including the anamorphically-enlarged image is incident to the auxiliary optical system, the anamorphic lens may compress and correct the anamorphically-enlarged image.

The auxiliary optical system may be constructed such that the multi-colored lens unit, the light collection unit and the anamorphic lens are sequentially arranged.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to example embodiments of the present disclosure, which are illustrated in the accompanying drawings. Wherever possible, the same reference numbers will be used throughout the drawings to refer to the same or like parts.

Figure 1:
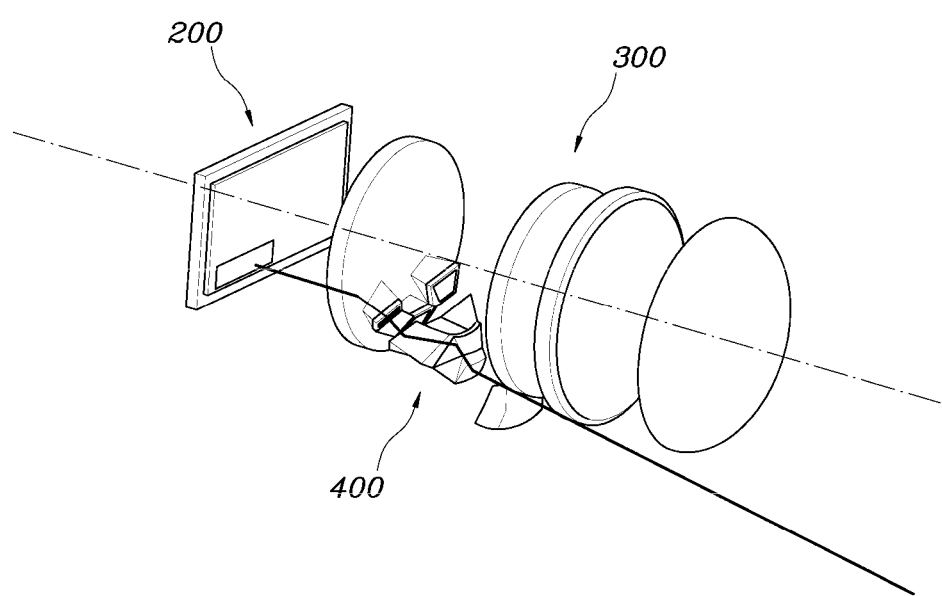
FIG. 1 is a view showing a vehicle headlamp device according to an example embodiment.

FIG. 1 is a view showing an example embodiment of a vehicle headlamp device, and FIGS. 2 to 5 are views further describing the example vehicle headlamp device depicted in FIG. 1.

The present disclosure provides a vehicle headlamp configured to project driving information onto the road using a high beam. Because a vehicle lamp device for creating a low beam is a well-known technology, a detailed explanation of a device for emitting a low beam is omitted herein.

Figure 2:
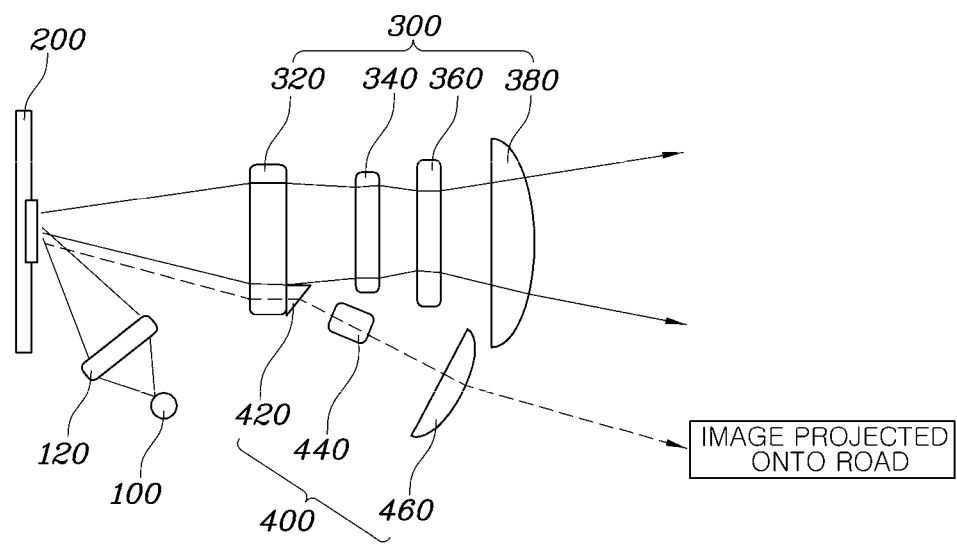
FIGS. 2 to 5 are views further describing the example embodiment of the vehicle headlamp device depicted in FIG. 1.

As shown in FIGS. 1 and 2, an example vehicle headlamp device comprises a light source 100 for generating light; a reflection unit 200 that reflects the light emitted from the light source 100 and includes divided light reflection sections for changing the path of the light; a primary optical system 300 that receives the light reflected by reflection unit 200 along one path and emits the light as a high beam; and an auxiliary optical system 400 that (i) receives the light reflected by reflection unit 200 along a different path from the path leading to primary optical system 300, (ii) has a plurality of color patterns for changing the color of the light incident thereto, and (iii) projects the light onto the road.

As described above, the example vehicle headlamp device comprises the light source 100, the reflection unit 200, the primary optical system 300 and the auxiliary optical system 400. The vehicle headlamp device may further include a condensing lens 120. Light generated from light source 100 may be emitted to reflection unit 200 via condensing lens 120. The path of the light emitted by light source 100 is determined by reflection of the light from reflection unit 200. Reflection unit 200 reflects light from light source 100 and directs it to primary optical system 300, which emits the light as a high beam. Light from light source 100 that is directed to the auxiliary optical system 400 is projected onto the road. Specifically, the light projected onto the road through the auxiliary optical system 400 may include a specific image due to the reflection unit 200. Because the color of the low beam is similar to the color of the high beam, the visibility of the driving information projected onto the road is diminished. Accordingly, the present disclosure provides an auxiliary optical system 400 with a plurality of color patterns to change the color of the light incident thereto into a specific color suitable for projecting driving information onto the road, thus improving the visibility of the image. Further, light from light source 100 is selectively reflected by reflection unit 200 to the multi-colored elements of the auxiliary optical system 400, allowing driving information to be projected onto the road in various colors.

In the example embodiment described herein, reflection unit 200 may be a digital micro-mirror device ("DMD"), which includes a plurality of micro mirrors that can be switched on or off in response to a driving signal. When reflection unit 200 is switched on or off, the angle of the micro mirrors may be controlled by a motor and adjusted to change the path of the incident light. In particular, when reflection unit 200 is switched on, the angle of the micro mirrors may be adjusted so that light from light source 100 is directed toward primary optical system 300. When reflection unit 200 is switched off, the angle of the micro mirrors may be adjusted so that light from light source 100 is directed toward the auxiliary optical system 400.

Figure 3:
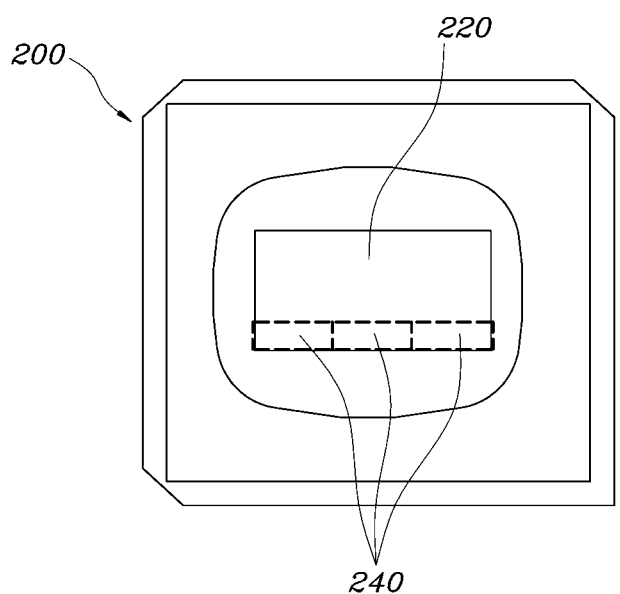
Figure 4:
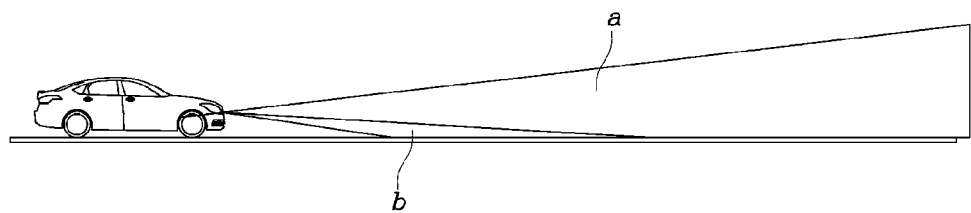

As shown in FIG. 3, reflection unit 200 may be divided into a primary section 220 that reflects light from light source 100 toward primary optical system 300; and a secondary section 240 that reflects the light toward auxiliary optical system 400. As shown in FIG. 4, when light from light source 100 is reflected by primary section 220 of reflection unit 200 and is directed to primary optical system 300, the light is projected to a high beam region a. When the light from light source 100 is reflected by secondary section 240 of reflection unit 200 and is directed to auxiliary optical system 400, the light is projected to an information region on the road b. Because the light reflected by primary section 220 of the reflection unit 200 is emitted as a high beam, there must be a quantity of light sufficient to generate the beam. Therefore, it is preferable for primary section 220 to have a larger area than secondary section 240.

Secondary section 240 of reflection unit 200 may be divided into a plurality of sub-sections in accordance with the color patterns of auxiliary optical system 400. This allows the light passing through secondary section 240 and auxiliary optical system 40 to be emitted in various colors, e.g. in one of the various colors of auxiliary optical system 400 or in a combination thereof. Consequently, the specific image projected onto the road through auxiliary optical system 400 may be changed to color suitable for the driving information that is projected onto the road, and in a different color from the high beam. As a result, visibility of the projected driving information is improved, thus enabling the driver to more easily perceive the projected driving information.

Primary optical system 300 may include a plurality of lenses. Auxiliary optical system 400 may be mounted to one of the plurality of lenses of primary optical system 300, and, in particular, to the one of the plurality of lenses to which the light reflected by reflection unit 200 is first incident. Specifically, because auxiliary optical system 400 is mounted to the first one of the plurality of lenses comprising primary optical system 300, auxiliary optical system 400 may receive the light reflected by reflection unit 200 before primary optical system 300 adjusts the focus of light reflected by reflection unit 200. Although in alternative example embodiments, auxiliary optical system 400 may be mounted in the headlamp using another mounting structure, it is advantageous in terms of reducing the layout area to mount auxiliary optical system 400 to primary optical system 300.

As shown in FIGS. 1 and 2, primary optical system 300 may include a dual lens 320, a first lens 340, a second lens 360, and an aspherical lens 380. Dual lens 320 may serve to correct chromatic aberration. First lens 340 and second lens 360 may serve to adjust the intensity and size of light emitted from light source 100. Aspherical lens 380 may serve to correct distortion aberration of the light. In the example embodiment described herein, auxiliary optical system 400 may be mounted to dual lens 320 of primary optical system 300.

Figure 5:
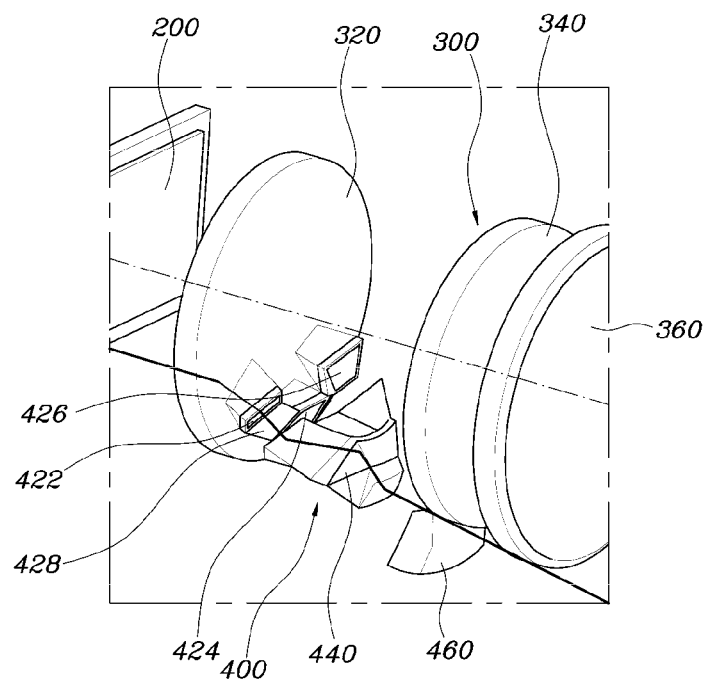

As shown in FIGS. 1, 2 and 5, auxiliary optical system 400 includes a multi-colored lens unit 420 having a plurality of color patterns, to which light reflected by reflection unit 200 is incident, and a light collection unit 440 disposed adjacent to multi-colored lens unit 420 that collects the light, the color of which has been changed by multi-colored lens unit 420, and emits the light.

Multi-colored lens unit 420 of auxiliary optical system 400 may serve to change the color of light reflected by reflection unit 200 and to emit the light, and light collection unit 440 of the auxiliary optical system 400 may serve to collect the light, the color of which has been changed by multi-colored lens unit 420, and to project the light onto the road. Multi-colored lens unit 420 may be divided into a green-colored section 422, a red-colored section 424 and a blue-colored section 426, and each of the colored section 422, 424 and 426 may be mounted to the primary optical system 300 using a bracket 428. The various colored sections of multi-colored lens unit 420 may cause the light to be emitted in a specific color corresponding to the color of a specific colored sections, or to be emitted in various other colors based on a combination of the colors of the colored sections. That is, using reflection unit 200 and multi-colored lens unit 420, it is possible to emit pink light by combining red and blue, to emit yellow light by combining red and green, and to emit white light by combining green, red and blue. As a result, the color of the light can be adjusted to a color suitable for projecting the driving information that onto the road in a manner that improves the visibility of the projected information.

Bracket 428 used to secure multi-colored lens unit 420 to primary optical system 300 may be transparent or semitransparent.

The adjustment of the color of the light is performed by reflection unit 200. Light may selectively reflected by secondary section 240 of reflection unit 200 to an appropriate path based on the desired color, e.g. green, red, blue or a combination thereof. Accordingly, as described above, secondary section 240 of reflection unit 200 is constructed such that the light is selectively directed toward the various colored sections of the multi-colored lens unit 420. Consequently, the light, which is incident on multi-colored lens unit 420 via reflection unit 200, goes through color compensation, is collected by light collection unit 440, and is projected onto the road in a particular desired color.

As shown in FIGS. 1 and 5, light emitted from light source 100 is reflected by reflection unit 200 and may be converted into an anamorphically-enlarged image. Auxiliary optical system 400 further includes an anamorphic lens 460. When light including an anamorphically-enlarged image is incident to auxiliary optical system 400, anamorphic lens 460 compresses and corrects the anamorphically-enlarged image in order to allow for projection of driving information that is easily readable by the vehicle driver.

In summary, the image projected onto the road is generated more clearly as the result of converting light from light source 100 into an anamorphically-enlarged image using reflection unit 200, adjusting the color of the anamorphically-enlarged image using multi-colored lens unit 420 and light collection unit 440 of auxiliary optical system 400, in which the multi-colored lens unit 420, the light collection unit 440 and the anamorphic lens 460 are sequentially arranged, and compressing and correcting the anamorphically-enlarged image using anamorphic lens 460. The driver is therefore capable of clearly perceiving the image containing the driving information even when it is projected onto the area of the road to which a low beam is radiated.

As is apparent from the above description, the present invention provides a vehicle headlamp device, which is capable of projecting driving information onto the road using a high beam and of improving visibility of an image containing driving information projected onto the road.

Specifically, by adjusting the color of the image containing the driving information that is projected onto the road, the vehicle headlamp device renders the projected information more easily readable for the driver and distinguishable from any other light (e.g. a high beam) projected by the headlamp. In addition, as the result of correcting the anamorphically-enlarged image using an anamorphic lens, the image containing the driving information is projected onto the road more clearly.

Although example embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A vehicle headlamp device comprising:
a light source;
a reflection unit that reflects the light emitted from the light source having a plurality of light reflection sections for changing a path of the light;
a primary optical system that receives the light reflected by the reflection unit along a first path and emits the light as a high beam; and
an auxiliary optical system having a plurality of color patterns for changing a color of the light incident thereto that receives the light reflected by the reflection unit along a second path and projects the light onto a road.

2. The vehicle headlamp device of claim 1, wherein the first path is different from the second path.

3. The vehicle headlamp device of claim 1, wherein the reflection unit comprises a digital micro-mirror device having a plurality of micro mirrors that can be changed in angle to change the path of the light incident thereto.

4. The vehicle headlamp device of claim 1, wherein the reflection unit is divided into a primary section that reflects the light from the light source toward the primary optical system and a secondary section that reflects the light toward the auxiliary optical system.

5. The vehicle headlamp device of claim 4, wherein the secondary section of the reflection unit comprises a plurality of sub-sections corresponding to a set of color patterns of the auxiliary optical system.

6. The vehicle headlamp device of claim 1, wherein the primary optical system comprises a plurality of lenses, and wherein the auxiliary optical system is mounted to one of the plurality of lenses of the primary optical system.

7. The vehicle headlamp of claim 1, wherein the auxiliary optical system is mounted to the one of the plurality of lenses comprising the primary optical system that is the first lens to which the light reflected by the reflection unit is first incident.

8. The vehicle headlamp device of claim 6, wherein the plurality of lenses in the primary optical system includes a dual lens, a first lens, a second lens, and an aspherical lens.

9. The vehicle headlamp device of claim 1, wherein the auxiliary optical system comprises a multi-colored lens unit having a plurality of color patterns, to which the light reflected by the reflection unit is incident, and a light collection unit disposed adjacent to the multi-colored lens unit and that collects the light and emits the light.

10. The vehicle headlamp device of claim 9, wherein the multi-colored lens unit is divided into a green-colored section, a red-colored section and a blue-colored section, and each of the colored sections is mounted to the primary optical system using a bracket.

11. The vehicle headlamp device of claim 9, wherein the auxiliary optical system further comprises an anamorphic lens that compresses and corrects an anamorphically-enlarged image created by the reflection of light emitted from the light source through the reflection unit.

12. The vehicle headlamp device of claim 11, wherein the multi-colored lens unit, the light collection unit and the anamorphic lens are sequentially arranged in the auxiliary optical system.

* * * * *